United States Patent
Lassesson et al.

(10) Patent No.: US 8,274,410 B2
(45) Date of Patent: Sep. 25, 2012

(54) DATA INPUT INTERFACE AND METHOD FOR INPUTTING DATA

(75) Inventors: Kristian Lassesson, Kavlinge (SE); Per Holmberg, Dalby (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1066 days.

(21) Appl. No.: 12/051,145

(22) Filed: Mar. 19, 2008

(65) Prior Publication Data

US 2009/0102685 A1     Apr. 23, 2009

Related U.S. Application Data

(60) Provisional application No. 60/981,528, filed on Oct. 22, 2007.

(51) Int. Cl.
*H03M 17/94* (2006.01)

(52) U.S. Cl. ............... 341/23; 341/24; 341/25; 341/26; 341/22; 200/5 A; 200/5 B

(58) Field of Classification Search .............. 341/23, 341/22
See application file for complete search history.

(56) References Cited

U.S. PATENT DOCUMENTS

| | | | | |
|---|---|---|---|---|
| 2003/0197736 A1* | 10/2003 | Murphy | ......................... | 345/780 |
| 2005/0140653 A1* | 6/2005 | Pletikosa et al. | .............. | 345/168 |
| 2006/0131157 A1 | 6/2006 | Chadha | | |
| 2007/0046641 A1* | 3/2007 | Lim | ............................. | 345/173 |
| 2007/0166091 A1* | 7/2007 | Griffin | .......................... | 400/486 |
| 2007/0182595 A1* | 8/2007 | Ghasabian | ...................... | 341/22 |
| 2007/0256915 A1* | 11/2007 | Levy | ............................. | 200/5 A |

FOREIGN PATENT DOCUMENTS

| | | |
|---|---|---|
| EP | 1 507 273 A1 | 2/2005 |
| EP | 1 585 153 A1 | 10/2005 |
| EP | 1 630 649 A1 | 3/2006 |
| WO | 2006/029530 A1 | 3/2006 |

OTHER PUBLICATIONS

International Search Report, corresponding to PCT/EP2008/053782, date of mailing Jul. 21, 2008.
Written Opinion of the International Searching Authority, corresponding to PCT/EP2008/053782, date of mailing Jul. 21, 2008.

* cited by examiner

*Primary Examiner* — Rexford Barnie
*Assistant Examiner* — Toan Vu
(74) *Attorney, Agent, or Firm* — Renner, Otto, Boisselle & Sklar, LLP

(57) ABSTRACT

The invention relates to a data input interface arranged to input data comprising a first set of keys, wherein all or a majority of the keys is adapted to indicate an input of a first set of symbols, arranged in a first structure, and a second set of keys, wherein all or a majority of the keys is adapted to indicate an input of a second set of symbols, arranged in a second structure, wherein the first set of keys and the second set of keys are integrated with each other.

13 Claims, 8 Drawing Sheets

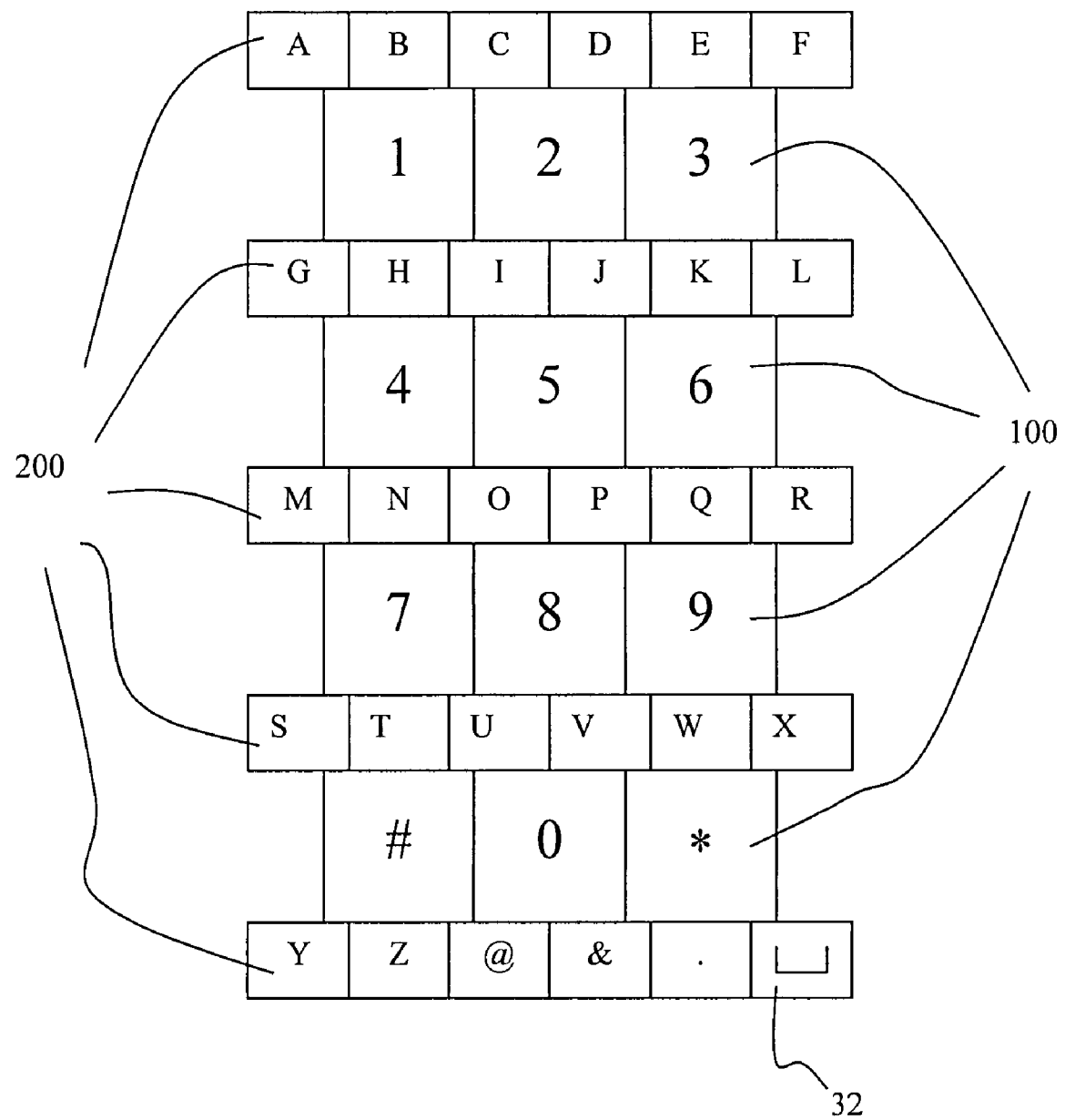
FIG: 7

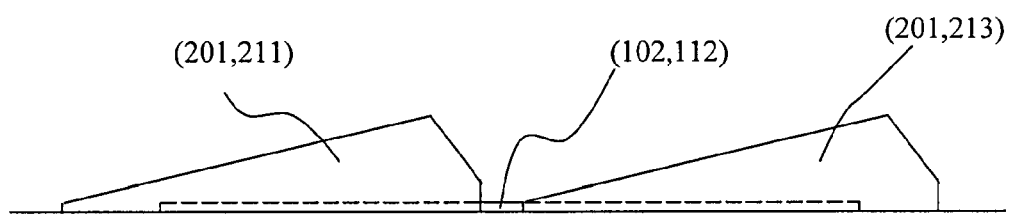
FIG: 8
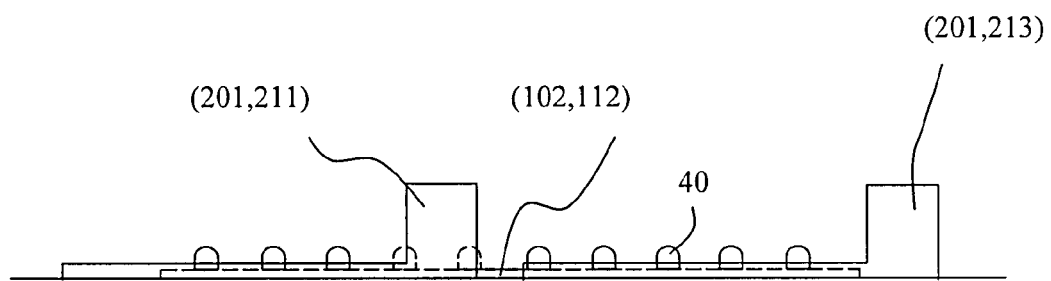
FIG: 9

DATA INPUT INTERFACE AND METHOD FOR INPUTTING DATA

CROSS-REFERENCE TO RELATED APPLICATION

This application claims the benefit of U.S. Provisional Patent Application Ser. No. 60/981,528, file Oct. 22, 2007, the entire disclosure of which is hereby incorporated by reference.

FIELD OF THE INVENTION

The invention relates to a data user interface and methods for inputting data. In particular, the invention relates to a data user interface of an electronic device.

BACKGROUND OF THE INVENTION

Today, there exists many types of electronic devices such as mobile telephones, media players, GPS modules, palmtop computers, cameras etc. Such devices comprise a user control interface having an output device, for example in the form of a display for presenting visual information such as letters, digits and also graphics and symbols related to the operation of the device in question. Furthermore, these devices have a data input interface enabling data input from a user.

Today, a number of different configurations of data input interfaces exist, such as touch panels, keypads and the like. There are a number of different keypads arranged to facilitate the input operation of a user. When operating a device comprising a conventional keypad a multi tap operation of a key are often needed to input a desired letter or symbol in a text message and there is a need to facilitate the operation of inputting data performed by a user.

SUMMARY OF THE INVENTION

Some embodiments of the invention address the need to facilitate the input operation performed by a user.

The invention relates to a data input interface for enabling user data input comprising a first set of keys, wherein all or a majority of the keys are adapted to indicate an input of a first set of symbols, the keys being arranged in a first structure, and a second set of keys, wherein all or a majority of the keys are adapted to indicate an input of a second set of symbols, the keys being arranged in a second structure, wherein the first and second set of keys are integrated with each other.

In an embodiment at least some of the keys of each set of keys are at least in one direction separated, such that a space is formed between the keys and at least one key of the second set of keys is arranged in the space between the keys of the first set of keys or vice versa.

In addition may the first structure be configured as a number of columns/rows of keys that are spaced laterally/vertically from one another and the second structure may be configured as a number of columns/rows of keys that are spaced laterally/vertically from one another, and wherein at least parts of the first structure may be provided in the arranged space between keys of the second structure and at least parts of the second structure may be provided in the arranged space between keys of the first structure.

In an embodiment the first set of symbols is numerical digits, *-symbol and #-symbol and the second set of symbols is letters and other text related symbols.

In an embodiment at least part of the first set of keys is further arranged to indicate an input of a letter when depressed repeatedly within a time interval.

In an embodiment the at least part of the second set keys is arranged to indicate an input of an additional letter or a number when the key is depressed repeatedly within a time interval.

Furthermore, the second set of keys may be adapted to indicate input of alphanumerical letters and the keys may be alphabetically arranged laterally or vertically.

In an embodiment keys of the second set are configured in a shape, such that the second set of keys presents a saw tooth like profile in order to distinguish the second set of keys from the first set of keys.

In an embodiment the first set of keys is made of a hard material and the second set of keys is made of a soft plastic material.

The interface may further comprise a third set of keys comprising a key arranged to function as a space bar.

An embodiment further relates to an electronic device comprising a data input interface according to the above and a processor arranged to register input from the data input interface.

The device may further be arranged with a program memory comprising a word prediction function program.

The invention further relates to a method for inputting a desired word on an electronic device, wherein the electronic device comprises a data input interface comprising a first set of keys, wherein all or a majority of the keys are adapted to indicate an input of a first set of symbols, arranged in a first structure wherein at least some of the keys are at least in one direction separated, such that a space is formed between the keys, and a second set of keys, wherein all or a majority of the keys is adapted to indicate an input of a second set of symbols, arranged in a second structure wherein at least some of the keys are at least in one direction separated such that a space is formed between the keys, wherein at least one key of the second set of keys is arranged in the space between the keys of the first set of keys, and the method comprises the steps of: inputting data by a user pressing a key indicating a symbol of the second set of symbols, and registering the input at a processor that outputs the input to a display of the electronic device.

In an embodiment the method further comprises the steps of: displaying a number of words related to the input on the display using a predictive function program running on the processor, and selecting a desired word of the words displayed either by the user scrolling a list of words or by pressing a key indicating a symbol of the first set of symbols.

The method may further comprises the steps of: displaying a number of words related to the input on the display using a correcting function program running on the processor, and selecting a desired word of the words displayed either by the user scrolling a list of words or by pressing a key indicating a symbol of the first set of symbols.

BRIEF DESCRIPTION OF THE DRAWINGS

The invention, together with further objectives and advantages thereof, may best be understood by reference to the following description taken in conjunction with the accompanying drawings in which:

FIG. 7 shows an enlarged overview of an embodiment of a data input interface, FIG. 8 shows an enlarged side view of a section of an embodiment of an data input interface, and FIG. 9 shows an enlarged side view of a section of an embodiment of a data input interface.

DETAILED DESCRIPTION OF EMBODIMENTS

Figure 1:
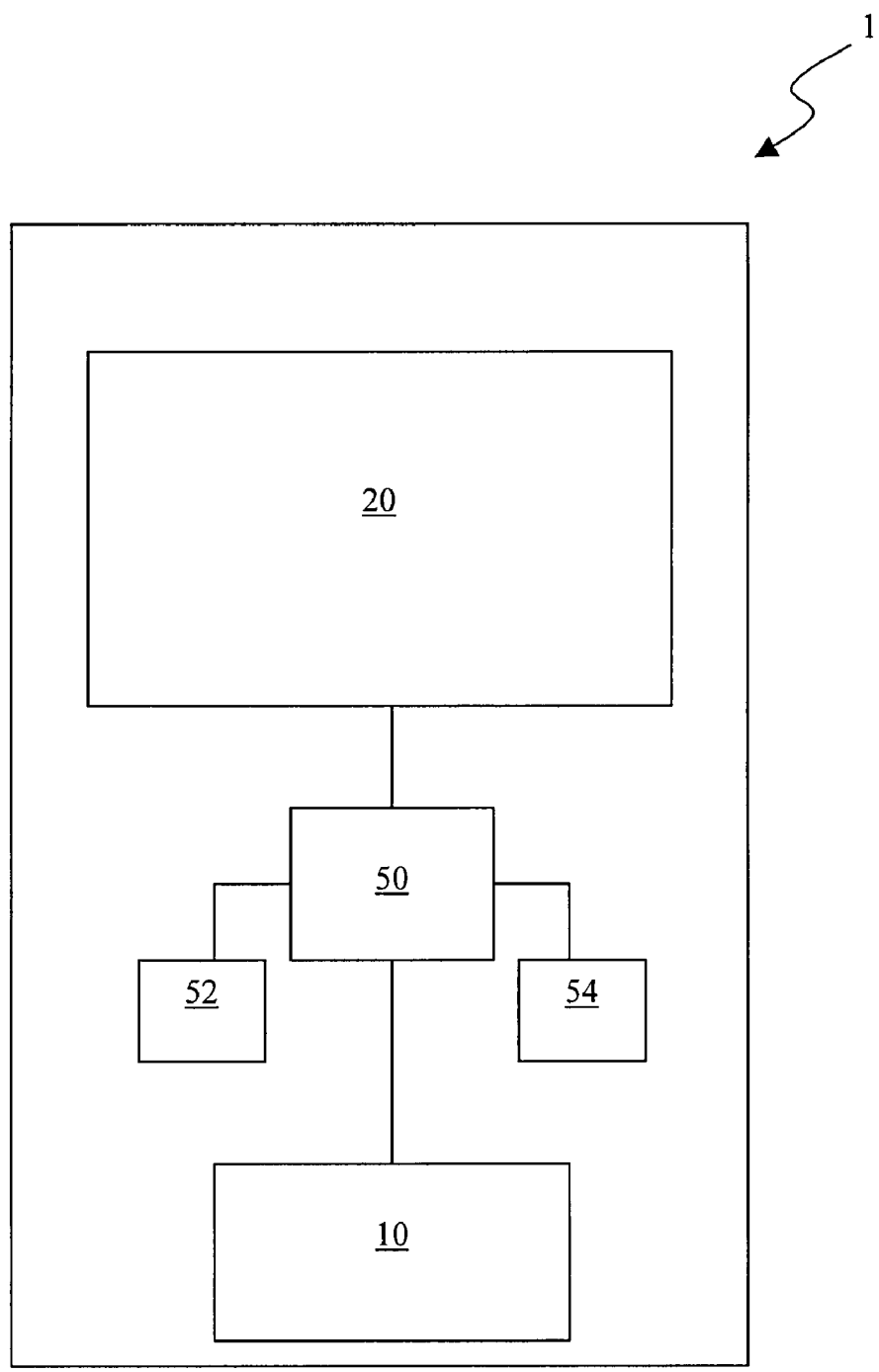
FIG. 1 shows a schematic overview of an electronic device.

FIG. 1 shows a schematic overview of an electronic device 1 comprising a data input interface 10, an output arrangement 20 and a processor 50 arranged to register input of the data user interface 10. The processor is further connected to memories 52, 54, wherein programs and the like are stored and fetched by the processor 50. The electronic device 1 is energized by an energy source.

Figure 2:
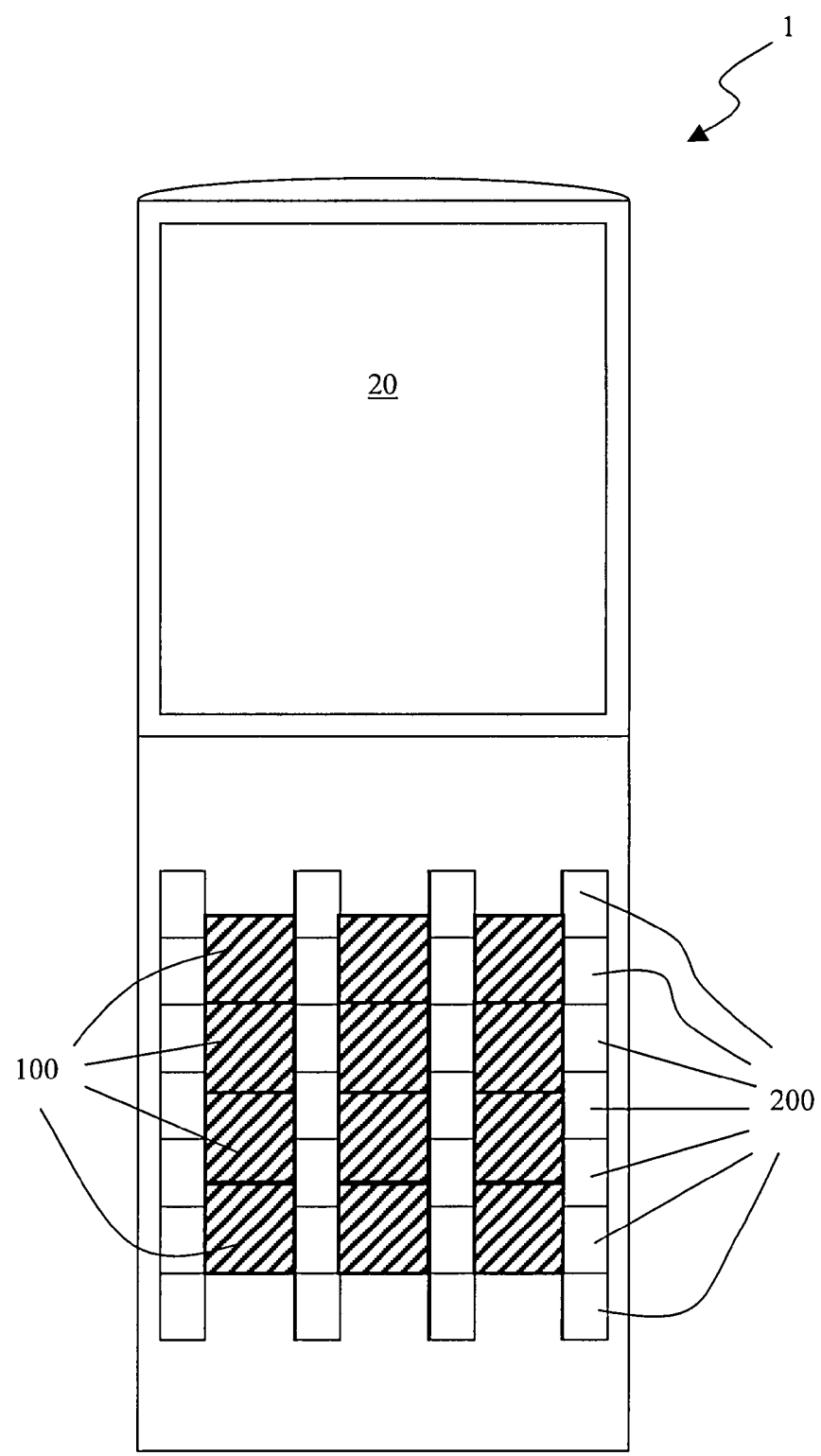
FIG. 2 shows a schematic overview of an electronic device comprising a data input interface.

FIG. 2 shows a schematic overview of an electronic device 1. The illustrated electronic device is a so called clam shell portable device. However, it should be noted that the electronic device may be any device comprising a data input interface. The present invention is described herein as employed in a wireless communications device, also denoted a mobile device. In the context of the invention, the mobile device may e.g. be a mobile phone, a PDA (Personal Digital Assistant) or any other type of portable computer such as laptop computer. Furthermore, the invention is described as adapted for selection of one out of a plurality of simultaneously detected communications networks. In this context, a communications network may e.g. be an IEEE 802.11 type WLAN, a WiMAX, a HiperLAN, a Bluetooth LAN, or a cellular mobile communications network such as a GPRS network, or a third generation WCDMA network. Given the rapid development in communications, there will of course also be future type wireless communications networks with which the present invention may be embodied, but the actual design and function of the network is not of concern for the invention.

The electronic device 1 comprises an output arrangement 20 and a data input interface. The data input interface comprises a first set of keys 100, indicated as diagonal lined keys, and a second set of keys 200. All of the first set of keys 100, or at least 50 percent of the keys, are adapted to indicate a first set of symbols, such as a certain function or functions, a set of data/characters or the like, and all of the second set of keys 200, or at least more than 50 percent, are adapted to indicate a second set of symbols, such as a different function/s or set of data/characters or the like. In an embodiment the keys of the first set of keys 100 indicates a first type of symbols and the keys of the second set of keys 200 indicate a second type of symbols, wherein the sets of symbols are different from each other. The different sets are arranged in a compact side by side manner to provide a data input interface that is compact and easy to operate.

A set of symbols may be numerical digits, letters, characters, signs or the like.

Figure 3:
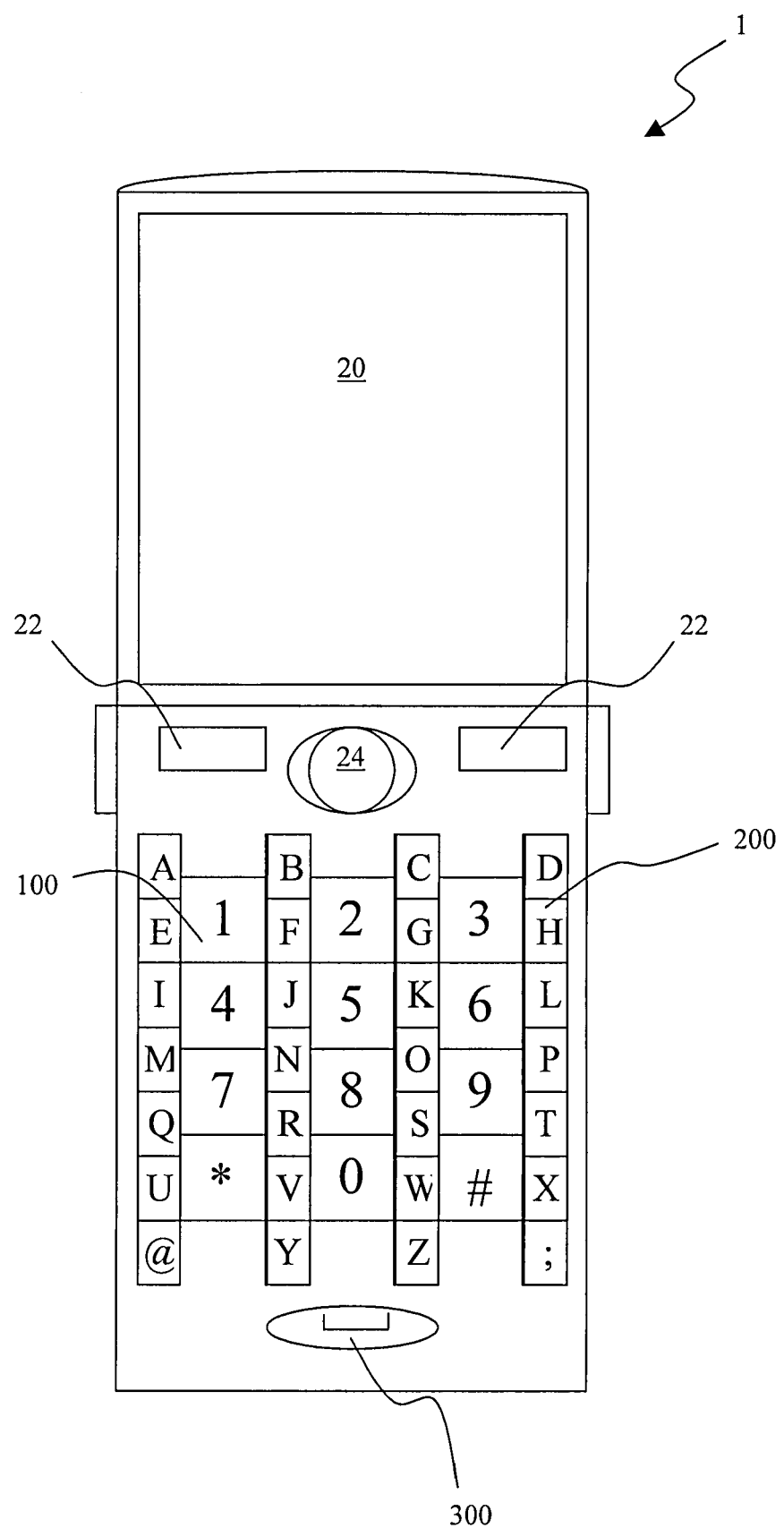
FIG. 3 shows a schematic embodiment of an electronic device arranged with a data input interface.

FIG. 3 discloses an embodiment of an electronic device 1 comprising an output arrangement 20, such as a display, and a data input interface. In the illustrated embodiment the data input interface comprises a number of different input keys, such as, two soft keys 22, an input stick 24, numerical keys 100 and textual keys 200.

The embodied data input interface comprises a first set of keys 100 arranged in a first structure comprising three columns of input keys with four input keys per column forming a first column and row structure. The first set of input keys is arranged to indicate data relevant for making a call, such as numerical digits, "number sign" #, and "star" * also known as "humphries" or the like. In the first column and row structure the keys are laterally separated from each other creating a space between the columns of keys.

A second set of keys 200 is arranged in the illustrated example as vertically arranged bars of keys. The second set of keys is arranged in a second structure comprising four columns of input keys, wherein each column comprises seven input keys. The columns are separated laterally forming a separated matrix of keys that is arranged side by side of the first set of keys 100. That is, the keys of the second set are arranged in the spaces between the keys of the first set and vice versa. The result of the illustrated integration of the two column and row structures is an arrangement comprising a first column of keys of a first set of keys followed by a first column of keys of a second set of keys and so on. It should be noted that in an embodiment parts of the sets of keys may be arranged in the spaces of the different sets. Further, it should be noted that the keys 100 in the first set of keys could be smaller than the keys 200 of the second set of keys, i.e. opposite to what is disclosed in FIG. 3.

In the illustrated embodiment the second set of keys is arranged to register textual input. The arrangement of using two sets of keys instead of integrating all letters to the numerical keys results in a compact data input interface that is very easy to operate. For example, the amount of multi-taps is reduced as one does not need to press "2" thrice to input a "C" but instead merely the C-key once. Consequently, this enables a user to increase the rate of inputting text. It should also be noted that in an arrangement wherein each alphanumeric letter is represented by one key the rate of inputting words is further increased since one may input the same letter twice without having to wait for the data input interface to register an input.

In an embodiment the keys of the second set is alphabetically arranged, vertically or laterally, which results in a key structure that is easy to find and, hence, facilitates the operation of writing text messages even for those who are beginners in using text messages.

Figure 4:
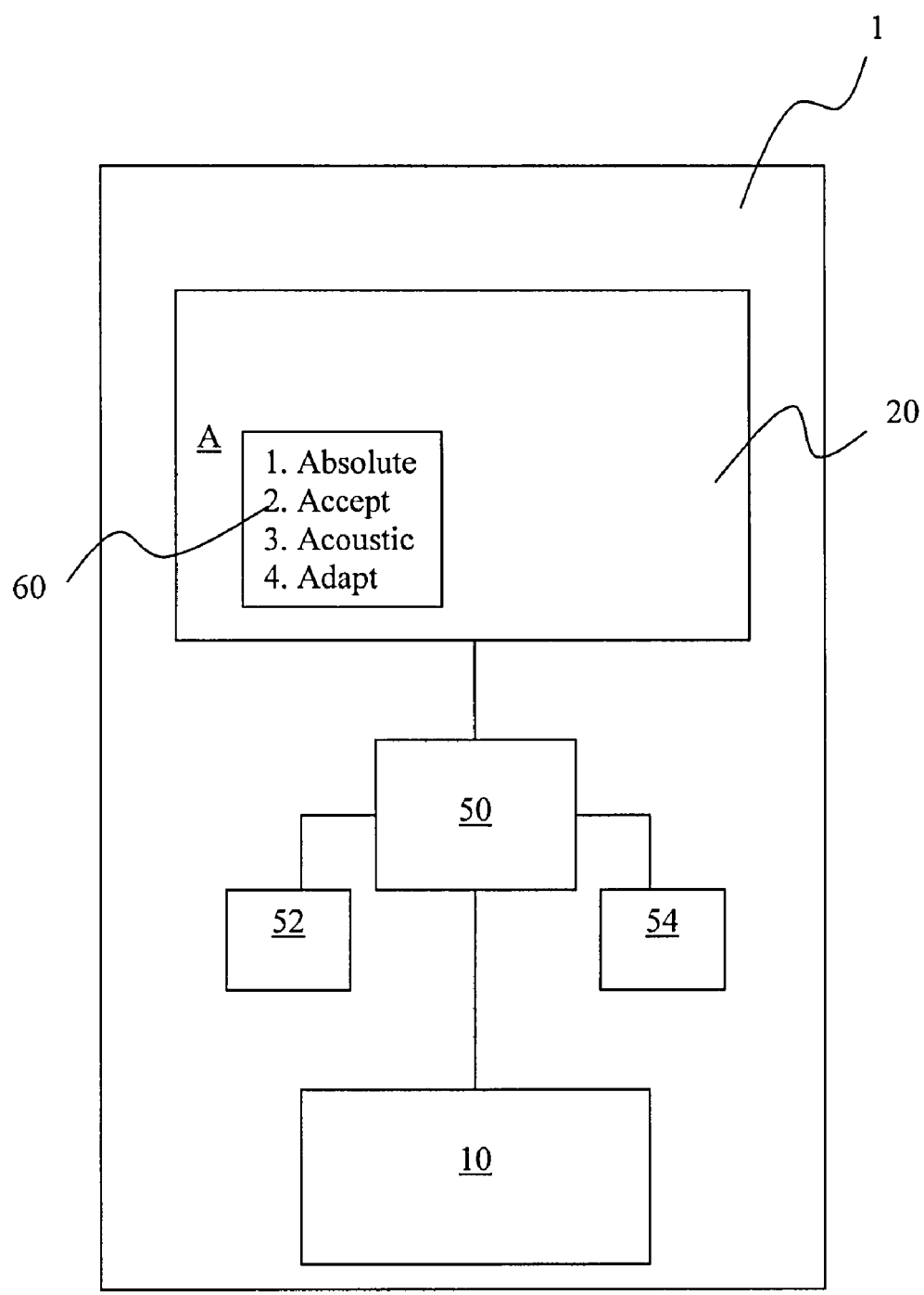
FIG. 4 shows an embodiment of an electronic device comprising a predictive functioning program.

FIG. 4 shows an embodiment of a portable electronic device 1 comprising a data input interface 10, an output arrangement 20, a processor 50 and a program memory 54 and a second memory 52. In the embodiment a predictive text function is installed in the program memory 54 to facilitate the input operation. The processor 50 fetches and executes the program during a text input operation. As a key of a second set of keys of the data input interface 10, representing a certain letter, is pressed the predictive text function will present words on the output arrangement to a user only relating to that letter, for example, in a roll down menu 60. Hence, the predictive text function will be improved using the data input interface as the number of words will be reduced. Consequently the number of input taps required to input a word will be reduced compared to a key structure wherein each key represents a plurality of letters and enables that the rate of inputting words may be increased. In an embodiment, as illustrated, the words presented to the user may be numbered and the user may select a word by pressing the numerical key, in a first set of keys, representing the desired word.

Figure 5:
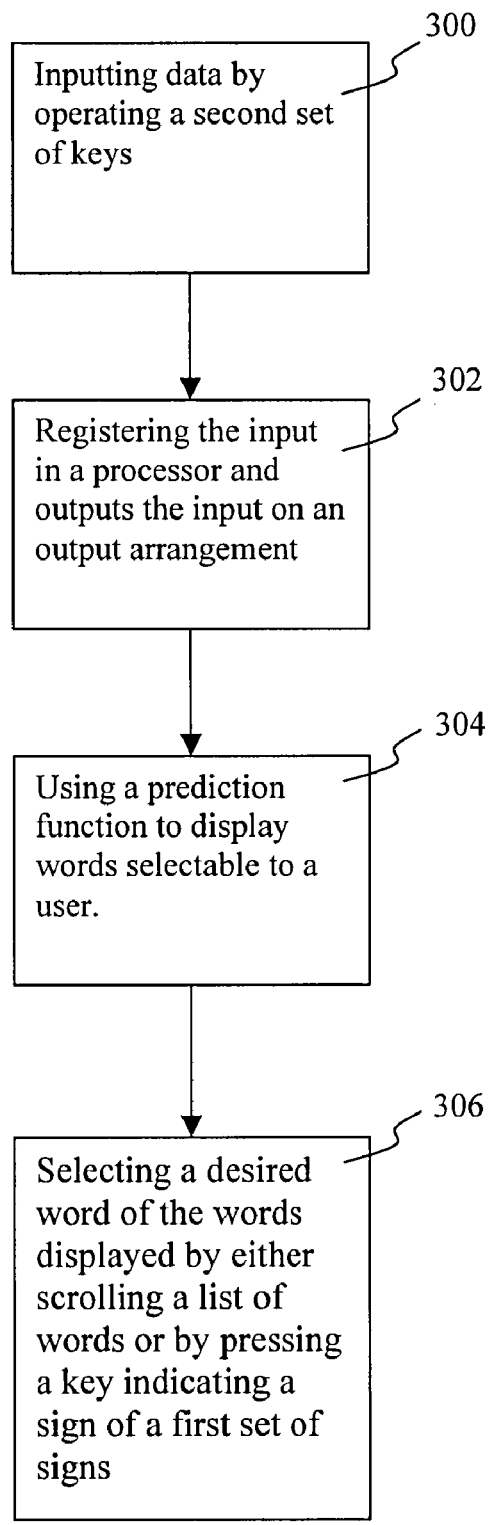
FIG. 5 shows a schematic overview of a method for inputting data using a predictive function.

In FIG. 5 a method of inputting data on an electronic device is disclosed.

In step 300 a user inputs data by pressing a key indicating a symbol of a second set of symbols, such as a letter.

In step 302 a processor registers the input and outputs the input to a display of the electronic device.

In step 304 a predictive function program that is running on the processor displays a number of words related to the input on the display.

In step 306 the user selects a desired word of the words displayed either by scrolling a list of words or by pressing a key indicating a symbol of a first set of symbols, such as a digit.

It should be noted that the displayed alternatives of words change as the user puts in more letters of the desired word.

A function that corrects erroneous input operates in a similar manner as the number of alternatives of a desired input is reduced. That is, it is easier to determine an input using an embodiment of the arrangement since every key mainly represents merely one letter resulting in fewer alternatives of desired words.

In an embodiment the data input interface is arranged to input an Asian language or the like, and the predictive text function will present words that start with the same syllable/stroke as the indication of that key. This solution enables a user to increase the rate of inputting Asian characters.

In some national languages a number of additional letters is provided, such as, ü, å, ä, ö or the like. These letters may be integrated in the numerical key set, textual key set or as individual keys. Even if the letters are integrated to the numeric/textual keys the number of taps required to input the letters will be reduced, for example, an "å" will be reduced from five taps to two taps.

In the illustrated example a key 300 representing a space bar function is arranged below the first set and the second set of keys on the electronic device 1. It should be noted that this key may be arranged above the first set and the second set of keys or as a key in one of the sets.

Figure 6:
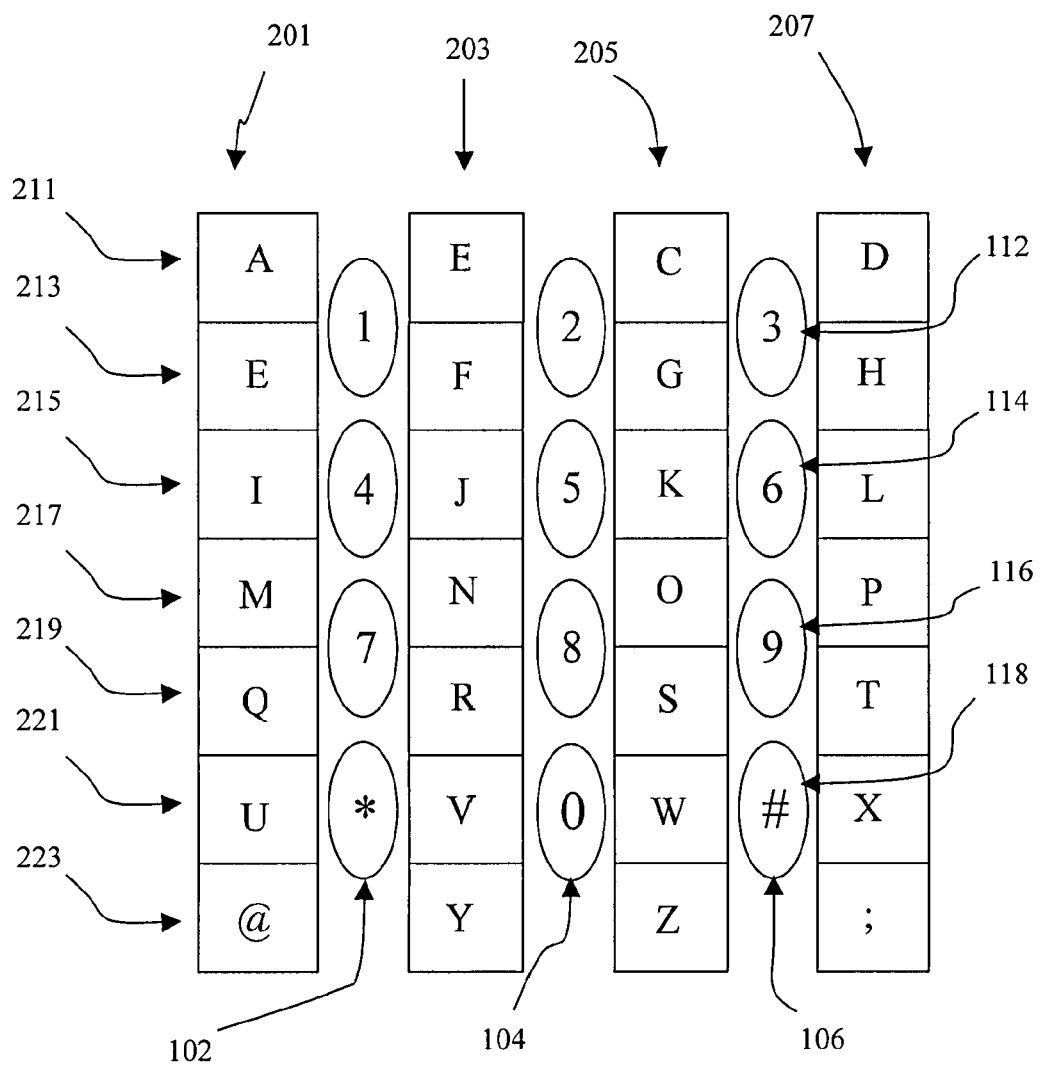
FIG. 6 shows an enlarged overview of an embodiment of a data input interface.

FIG. 6 discloses an embodiment wherein the first set of key comprises a number of small oval keys arranged in three columns 102, 104, 106 and in four rows 112, 114, 116, 118. The first set of keys is arranged to be used when inputting numerical digits and humphries, that is, # and *, for example when making a call.

A second set of rectangular keys in the embodiment functions as the letter/symbols input interface, wherein the keys are arranged in four columns 201, 203, 205, 207 and in seven rows 211, 213, 215, 217, 219, 221, 223. The second set of keys may be used when, for example, writing an SMS, mail and the like.

FIG. 7 discloses an embodiment of a data input interface for inputting data. The data input interface comprises a first set of keys 100 adapted to register input of digits and humphries, for example, to be used when dialing a phone number, and a second set of keys 200 arranged to register input of text symbols, such as letters, punctuation, typographic symbols and the like. In the illustrated embodiment the second set of keys 200 comprises a space bar key, denoted as 32.

The first set of keys 100 is configured as four rows of keys vertically spaced apart from one another, each row containing three input keys. The second set of keys 200 is configured as five rows of keys vertically spaced apart, each row containing six input keys, thereby presenting thirty letter/symbol keys. The first and the second set of keys are meshed with one another, resulting in a data input interface wherein every second row comprises input keys of the first set of keys and every other row comprises input keys of the second set of keys. The keys of the second set are smaller than the keys of the first set of keys, approximately less than half the size, providing a compact arrangement.

The result of the illustrated integration of the two sets of keys is an arrangement comprising a first row of keys of a first set of keys followed by a row of keys of a second set of keys and so on. It should be noted that the number of keys of each row may vary, for example, the first row of the second set of keys may contain five keys and the next row of the second set of key may contain six keys, as well as the number of rows.

In FIG. 8, an enlarged side view of an embodied data input interface for inputting data in accordance with the embodiment in FIG. 2. In the illustrated embodiment the keys (201, 211), (201,213), "A" and "E" keys in FIG. 2, have a pentagonal/trapezoid configuration, for example, an elevated lower portion, a sloping portion toward an upper portion. In this manner the column of keys forms a saw tooth like structure that is easy for an operator to feel, find and operate the appropriate key when operating an electronic device. In the illustrated example a key (102, 112), 1-key in FIG. 2, is disclosed behind the text keys. However, it should be understood that the first set of keys may be arranged to elevate over the second set of keys, the first set of keys could for instance be arranged up to 2 mm over the second set of keys In an embodiment the first set of keys is made of a first hard material, for example, plastic material, such as PC or PET, a metallic material or the like, to facilitate that a finger of a user may easily slide over the keys, and the second set of keys is in a different material, such as rubber, soft plastic or the like. It should be understood that the first set of keys may be keys of a rubber like material or the like and the keys of the second set of keys may be of a harder material, such as hard plastic or the like. This facilitates the operation of an arrangement for inputting data making it easier to differentiate the set of keys from each other by merely finger touch, due to the different surface properties, touch and feel, of the material. The keys may also be made of the same material. In the embodiment wherein the smaller keys, in the illustrated embodiments the textual keys, are made of rubber material, finding and operating a key is improved as a finger of the user does not easily slide over the keys.

In an embodiment the first set of keys and/or the second set of keys may be arranged with different patterned surfaces, such as rugged or the like, in order for a user to easily distinguish the sets of keys from each other.

In FIG. 9 an embodiment of input keys is disclosed wherein a first key (201, 211) and a second key (201,213) of the second set of keys comprises an elevated shoulder section in order to facilitate the input operation of a user. The shoulder is protruding from a base section of the key. As disclosed a key of the first set of keys may have a patterned surface, shown as ribs 40.

It should be understood that the number of keys in the first as well as the second set of keys may vary. The number of rows and columns may also vary and the keys of the different sets may be separated in any way, such as vertically and laterally or a combination thereof.

It should also be understood that the first set of keys indicating numerical digits may be used when, for example, writing a SMS, just as well as, the second set of keys indicating alphanumerical letters may be used, for example, when making a call by inputting a name.

Furthermore, it should be noted that the data input interface may be a virtual data input interface. That is, the data input interface may be a set of illustrated keys arranged on a touch panel.

The arrangement provides a possibility of an electronic device with a compact data input interface that is easy to operate.

The foregoing has described the principles, preferred embodiments and modes of operation of the present invention. However, the invention should be regarded as illustrative rather than restrictive, and not as being limited to the particular embodiments discussed above. It should therefore be appreciated that variations may be made in those embodiments by those skilled in the art without departing from the scope of the present invention as defined by the following claims.

The invention claimed is:

1. A data input interface for enabling user data input comprising
    a first set of keys, wherein all or a majority of the keys are adapted to indicate an input of a first set of symbols, the keys being arranged in a first structure, and
    a second set of keys, wherein all or a majority of the keys are adapted to indicate an input of a second set of symbols, the keys being arranged in a second structure, wherein the first and second set of keys are integrated with each other,
    wherein keys of the second set are configured in a shape, such that the second set of keys presents a saw tooth like profile in order to distinguish the second set of keys from the first set of keys, and
    wherein the first set of keys is made of a hard material and the second set of keys is made of a soft plastic material.

2. A data input interface according to claim 1, wherein at least some of the keys of each set of keys are at least in one direction separated, such that a space is formed between the keys and wherein at least one key of the second set of keys is arranged in the space between the keys of the first set of keys or vice versa.

3. A data input interface according to claim 2, wherein the first structure is configured as a number of columns/rows of keys that are spaced laterally/vertically from one another and the second structure is configured as a number of columns/rows of keys that are spaced laterally/vertically from one another, and wherein at least parts of the first structure are provided in the arranged space between keys of the second structure and at least parts of the second structure are provided in the arranged space between keys of the first structure.

4. A data input interface according to claim 1, wherein the first set of symbols is numerical digits, *-symbol and #-symbol and the second set of symbols is letters and other text related symbols.

5. A data input interface according to claim 4, wherein at least part of the first set of keys is further arranged to indicate an input of a letter when depressed repeatedly within a time interval.

6. A data input interface according claim 4, wherein the at least part of the second set keys is arranged to indicate an input of an additional letter or a number when the key is depressed repeatedly within a time interval.

7. A data input interface according to claim 1, wherein the second set of keys is adapted to indicate input of alphanumerical letters and the keys are alphabetically arranged laterally or vertically.

8. A data input interface according to claim 1, comprising a third set of keys comprising a key arranged to function as a space bar.

9. An electronic device comprising a data input interface according to claim 1 and a processor arranged to register input from the data input interface.

10. An electronic device according to claim 9, wherein the device further is arranged with a program memory comprising a word prediction function program.

11. A method for inputting a desired word on an electronic device, wherein the electronic device comprises a data input interface comprising a first set of keys, wherein all or a majority of the keys are adapted to indicate an input of a first set of symbols, arranged in a first structure wherein at least some of the keys are at least in one direction separated, such that a space is formed between the keys, and a second set of keys, wherein all or a majority of the keys is adapted to indicate an input of a second set of symbols, arranged in a second structure wherein at least some of the keys are at least in one direction separated such that a space is formed between the keys, wherein at least one key of the second set of keys is arranged in the space between the keys of the first set of keys, wherein keys of the second set are configured in a shape, such that the second set of keys presents a saw tooth like profile in order to distinguish the second set of keys from the first set of keys, wherein the first set of keys is made of a hard material and the second set of keys is made of a soft plastic material, and the method comprises the steps of:
    inputting data by a user pressing a key indicating a symbol of the second set of symbols,
    said inputting data comprising using the saw tooth like profile of keys of the second set of keys to distinguish the second set of keys from the first set of keys, and using the hard and soft material of the respective first and second sets of keys to help differentiate the respective sets of keys, and
    registering the input at a processor that outputs the input to a display of the electronic device.

12. A method according to claim 11, wherein the method further comprises the steps of:
    displaying a number of words related to the input on the display using a predictive function program running on the processor, and
    selecting a desired word of the words displayed either by the user scrolling a list of words or by pressing a key indicating a symbol of the first set of symbols.

13. A method according to claim 11, wherein the method further comprises the steps of:
    displaying a number of words related to the input on the display using a correcting function program running on the processor, and
    selecting a desired word of the words displayed either by the user scrolling a list of words or by pressing a key indicating a symbol of the first set of symbols.

* * * * *